(12) United States Patent
Charrat et al.

(10) Patent No.: US 11,075,692 B2
(45) Date of Patent: Jul. 27, 2021

(54) METHOD FOR DEFINING THE FLEXIBLE PAYLOAD OF A TELECOMMUNICATIONS SATELLITE WITH LOW-INTERFERENCE-LEVEL BEAM HOPPING

(71) Applicant: THALES, Courbevoie (FR)

(72) Inventors: Bernard Charrat, Toulouse (FR); Mathieu Dervin, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/569,333

(22) Filed: Sep. 12, 2019

(65) Prior Publication Data

US 2020/0350985 A1  Nov. 5, 2020

(30) Foreign Application Priority Data

Sep. 13, 2018  (FR) ...................................... 1800958

(51) Int. Cl.
*H04B 7/204* (2006.01)
*H04B 7/185* (2006.01)

(52) U.S. Cl.
CPC ....... *H04B 7/2041* (2013.01); *H04B 7/18513* (2013.01)

(58) Field of Classification Search
CPC .................................................. H04B 7/2041
See application file for complete search history.

(56) References Cited

U.S. PATENT DOCUMENTS

| 2009/0270088 A1 | 10/2009 | Fenech et al. |
| 2017/0181160 A1* | 6/2017 | Corbel ................. H04B 17/336 |
| 2017/0288769 A1 | 10/2017 | Miller et al. |

FOREIGN PATENT DOCUMENTS

| EP | 1973240 A2 | 9/2008 |
| WO | 2017211430 A1 | 12/2017 |

* cited by examiner

*Primary Examiner* — Edan Orgad
*Assistant Examiner* — Won Tae C Kim
(74) *Attorney, Agent, or Firm* — BakerHostetler

(57) ABSTRACT

A method for defining the flexible payload of a telecommunications satellite with low-interference-level beam hopping includes: a first step of defining the capacity from which each beam must benefit on account of the density of exchanges to be delivered by the beam; a second step of determining, depending on the various power-amplifier sharing schemes, the maximum number Pi of beams that an amplifier is able to deliver and the average capacity allocated to each beam; a third step of forming groups of beams, each characterized by the average value of the cumulative capacity of the beams that form it, and determining the number of amplifiers required for each formed group; a fourth step, during which the various beams are distributed between various amplifiers, in such a way that the average value of the load placed on these beams is substantially equal to the average load of the group in question.

9 Claims, 9 Drawing Sheets

| P Tube (W) | BW Tube (MHz) | Number of subbands-Partition | | | | | | | | | |
|---|---|---|---|---|---|---|---|---|---|---|---|
| | | Beam Hopping | | 2 SB 75%-25% | | 2 SB 2x50% | | 2 SB 2x50% | | 4 SB 4x25% | | 4 SB 4x25% | |
| | | Beam Coupling | Capacity per tube (Mbps) | 0 | | 0 | | 2 | | 2 | | 4 | |
| | | | | Capacity per bm (Mbps) | N_bm | Capacity per bm (Mbps) | N_bm | Capacity per bm (Mbps) | N_bm | Capacity per bm (Mbps) | N_bm | Capacity per bm (Mbps) | N_bm |
| 160 | 2900 | 0 | 1 971.58 | 1 478.7 | 1 | 492.9 | 1 | 492.9 | 2 | 246.4 | 8 | 123.2 | 16 |
| 240 | 2900 | 0 | 2 617.70 | 1 963.625 | 1 | 654.425 | 1 | 654.4 | 2 | 327.2 | 8 | 163.6 | 16 |
| 160 | 2900 | 2 | 968.07 | 363.0 | 2 | 121.0 | 2 | 121.0 | 4 | 60.5 | 16 | 30.3 | 32 |
| 240 | 2900 | 2 | 1 537.62 | 576.6 | 2 | 192.2 | 2 | 192.2 | 4 | 96.1 | 16 | 48.1 | 32 |
| 160 | 2900 | 4 | 125.58 | 23.55 | 4 | 7.85 | 4 | 15.7 | 8 | 3.9 | 32 | 2.0 | 64 |
| 240 | 2900 | 4 | 597.30 | 111.975 | 4 | 37.325 | 4 | 74.7 | 8 | 18.7 | 32 | 9.3 | 64 |

Abbreviation: bm = beam
BW = Bandwidth

Fig. 3

Fig. 4    Third step overview

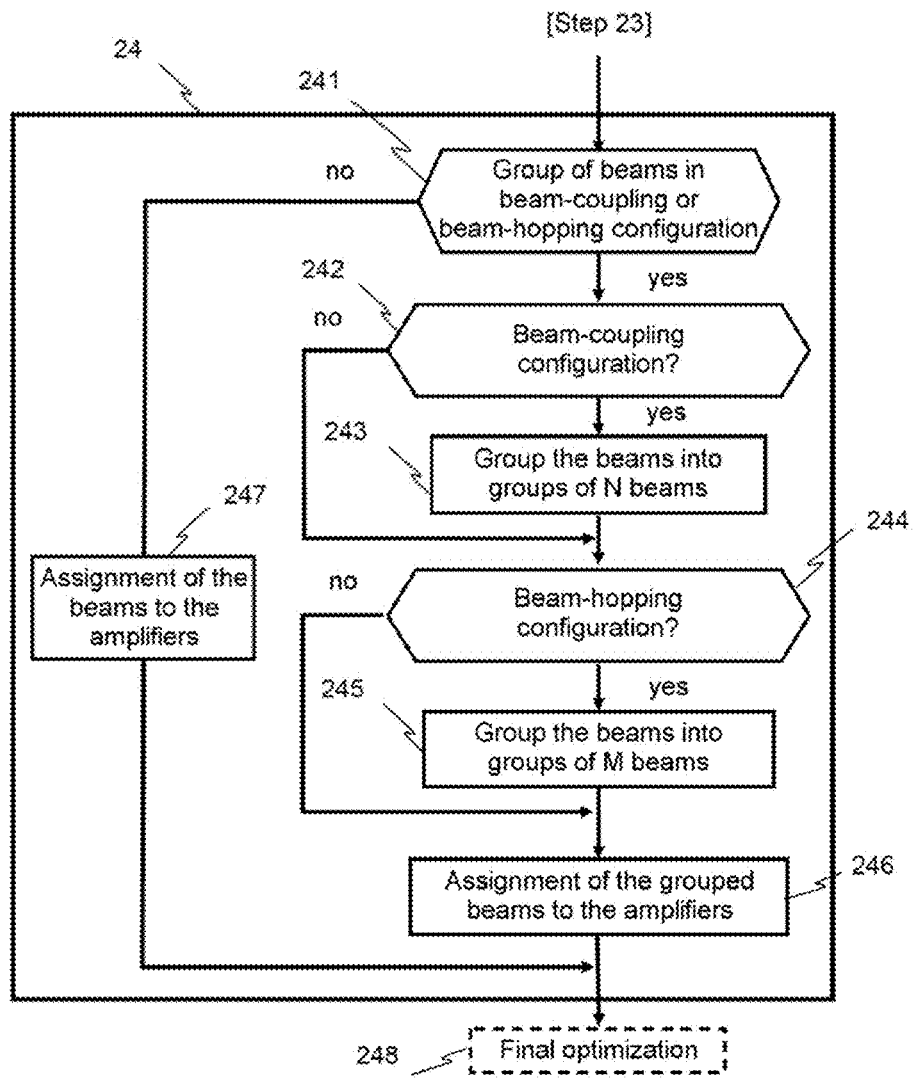
Fig. 9    Fourth step overview ated zones of high demand in which the high number of users averages the demand. Thus, operators require, for these missions, flexibility between elementary zones of low demand.

METHOD FOR DEFINING THE FLEXIBLE PAYLOAD OF A TELECOMMUNICATIONS SATELLITE WITH LOW-INTERFERENCE-LEVEL BEAM HOPPING

CROSS-REFERENCE TO RELATED APPLICATIONS

This application claims priority to foreign French patent application No. FR 1800958, filed on Sep. 13, 2018, the disclosure of which is incorporated by reference in its entirety.

FIELD OF THE INVENTION

The invention relates to the general field of communication satellites providing links between users travelling in a given geographic zone and gateways (stations d'ancrage to use the French term) through which the users are connected to the network via the satellite link.

It more particularly relates to multispot satellites and to problems with the distribution of the overall capacity of the satellite, or in other words with the distribution of the overall information throughput that the satellite is able to achieve, between the various spots that make up the area covered by said satellite.

BACKGROUND

In certain markets, such as the broadband mobile market for example, operators that employ telecommunication satellites require solutions that allow communication capacity to be non-uniformly distributed over the covered area. In these markets, elementary zones of low demand see large variations in their demand over time, contrary to elementary zones of high demand in which the high number of users averages the demand. Thus, operators require, for these missions, flexibility between elementary zones of low demand.

They also would like these solutions to:
minimize the total capacity loss that this flexibility could cause (increase of interference in the covered area, payload of the satellite penalized with respect to launch weight per Mbps (megabits per second) or required power per Mbps, etc.);
minimize the number of high-power amplifiers, of travelling-wave-tube (TWT) amplifiers for example, required to feed the antennas (radiating elements) that radiate the beams corresponding to the various spots (impact on weight and consumption, lower cost);
minimize the number of antennas required.

At the present time, also, each of the beams emitted by an antenna has a bandwidth corresponding to a given set maximum information throughput, this maximum throughput allowing a given maximum number of communications to be established, and therefore a given number of users to use the communication beam in question.

Generally, the various beams of a given antenna offer a relatively uniform capacity, whatever is in fact the number of users actually present in the spot in question.

However, in practice, there are disparities in demand between each of the spots, and hence it is possible to differentiate between:
spots of low communication density, in which the total capacity (i.e. the maximum throughput) allocated is underexploited, at least in certain periods;
spots of high communication density, in which the capacity allocated to the spot in question is completely exploited and may even prove to be insufficient in certain periods.

Subsequently, to take into account, as much as possible, the distribution of users over the total covered zone and the geographical nonuniformity of the demand served by the satellite in question, it is sometimes necessary to envision a conventional solution consisting in dividing the total zone into spots having different sizes, these spots moreover being irradiated by beams of different sizes that however have a similar bandwidth.

The total zone covered by the satellite is then divided into spots of large sizes that correspond to zones having a low density of users and into spots of smaller sizes having a high density of users. This division allows, for each beam, the capacity/irradiated area ratio to be modulated and thus the total communication capacity of the satellite to be optimally distributed.

Implementation of such a solution however has the drawback of introducing boundary zones in which interference is high and performance degraded (borders between spots of high demand and spots of low demand). These difficulties increase as the intermingledness of the zones of high and low demand increases.

Moreover, it requires a plurality of antennas of different reflector sizes, suitable for the size of spots to be formed, to be provided, this being very disadvantageous with respect to number of antennas.

Another way of taking into account, as much as possible, the distribution of users over the total zone covered by the satellite in question consists in performing a non-uniform allocation of the bandwidth available to the satellite between the beams covering the various spots.

This allocation may for example be achieved by filtering the satellite signal downstream of the power amplifier located on-board the satellite, before the various beams are formed.

The implementation of such a solution, apart from the fact that it requires specific filters to be developed, very narrow filters for the beams intended for spots of very low demand in particular, has the drawback of providing no flexibility between spots of low demand and spots of higher demand. However, in a mobile market, spots of low demand see large variations in their demand over time, contrary to spots of high demand, in which the high number of users allows demand to be averaged over time.

SUMMARY OF THE INVENTION

One aim of the invention is to provide a solution that allows the capacity of a satellite to be non-uniformly distributed over the covered zone, while introducing a level of flexibility that is inversely proportional to the demand in the zone in question.

Another aim of the invention is to provide a solution that is economical with respect to amount of hardware (number of amplifiers, antennas, etc.) and therefore with respect to launch weight.

To this end, the subject of the invention, according to a first aspect, is a method for distributing the capacity of a communication satellite between the various beams intended to cover a given geographical zone, said zone being divided into a plurality of spots, each spot being irradiated by one given beam emitted by one radiating element of a satellite antenna and requiring a given capacity. The method according to the invention implements:

a first step of defining, for each beam, the capacity from which the beam must benefit on account of the density of exchanges occurring in the corresponding spot;

a second step of generating a table indicating, for a power amplifier having various operating bandwidth and power characteristics, the maximum number $P_i$ of beams that the amplifier is able to deliver and the average capacity allocated to each beam, depending on various amplifier sharing schemes;

a third step of forming groups of beams, each group being characterized by the average value of the capacity of the beams forming the group in question, and determining the number of amplifiers required in each group to deliver all of the beams forming this group;

a fourth step of allocating available resources, during which step the method distributes the various beams between various amplifiers, the beams assigned to a given amplifier being determined in such a way that the average value of the capacity demanded by these beams is substantially equal to the reference average capacity computed for the group in question.

In various configurations, the method according to the invention also comprises the following features.

According to a first feature, the third step is an iterative step that implements the following substeps:

a first substep during which the method computes, for a set of $N_T$ beams classed in increasing order of capacity, the average value of the cumulative capacity of these beams, the capacity required for each beam having been determined in the first step;

a second substep, during which the method according to the invention associates, in a first group i, the $N_i$ beams for which the average value of the cumulative capacity is closest to a given value, $Ci\_obj$, of the average capacity per beam; this value being determined, from the data of the table generated in the second step, so as to maximize the number of beams able to be delivered by the power amplifiers available to the satellite while ensuring an optimal link budget; the $N_i$ beams associated in a given group i at the end of a given iteration being withdrawn from the N beams considered in the execution of a new iteration; the iterations being interrupted once the $N_T$ beams have been grouped.

According to another feature, in the fourth step of allocating resources, the method couples a plurality of beams number depending on the sharing scheme of the group forming a given group i and using the same subband for the associates with a given amplifier.

According to another feature, the fourth step comprises the following phases of execution:

a first phase during which each group of beams formed is classified depending on the sharing scheme that is associated therewith, the groups of beams associated with a sharing scheme employing neither beam coupling nor beam hopping not being the subject of any subsequent systematic group-assignment operation;

a second phase during which it is determined, for each group subjectable to a grouping operation, whether the sharing scheme that is associated therewith employs N-beam beam coupling;

a third phase that groups beams of the group in question into groups of N;

this third phase being executed if the sharing scheme associated with the group employs N-beam beam coupling;

a fourth phase during which it is determined, for each group subjectable to a grouping operation, whether the sharing scheme that is associated therewith employs M-beam beam hopping;

a fifth phase during which beams of the group in question are grouped into groups of M; this fifth phase being executed if the sharing scheme associated with the group employs M-beam beam hopping;

a sixth phase during which, for each group, depending on the groupings performed, an amplifier is assigned to each beam;

a seventh phase during which, for each group the beams of which have been assigned to no group, an amplifier is directly assigned to each beam.

According to another feature, for each group associated with a sharing scheme employing beam coupling and beam hopping, the fifth phase groups the beams of the groups using the grouping into subgroups of N beams carried out in the third phase of the fourth step.

According to another feature, during the fifth phase of the fourth step, the beams are grouped by grouping subgroups of N beams into structures each made up of k2N beams, these structures being formed by carrying out two steps:

a first iterative step of producing 2N-beam structures containing the beams of two groups of N beams, such that each structure is formed by that of the not yet associated groups having the maximum cumulative capacity and that of the not yet associated groups having therewith the minimum cumulative capacity;

a second iterative step of producing structures containing the beams of 2k groups of N beams;

the second step being repeated iteratively until M·N-beam structures are obtained, M·N being equal to the number of beams able to be delivered by an amplifier for the subband in question, in accordance with the adopted sharing scheme.

According to another feature, the first step, of producing 2N-beam structures containing the beams of two groups of N beams, consists in performing the following operations:

determining the group of N beams having the maximum cumulative capacity;

determining a second group of N beams having in addition with the first the minimum cumulative capacity;

associating the two groups in order to form a 2N-beam structure; repeating the preceding operations until all the groups of N beams are grouped into 2N-beam structures, or there remains only one group.

According to another feature, the second iterative step of producing structures containing the beams of 2k groups of N beams consists in performing the following operations:

determining the kN-beam structure having the maximum cumulative capacity;

determining a second group of kN beams having in addition with the first the minimum cumulative capacity;

associating the two structures to form a 2kN-beam structure;

repeating, until all the kN-beam structures are grouped into 2kN-beam structures or there remains only one structure;

each structure being formed, for a given iteration, by that of the not yet associated structures having the maximum cumulative capacity and that of the not yet associated structures having therewith the minimum cumulative capacity.

According to another feature, the fourth step comprises a complementary phase of final resource optimization consisting in intergroup processing, which tallies the amplifiers partially exploited in the context of a group of beams, and which attributes these amplifiers to beams of a different group using the band not used by the first group.

BRIEF DESCRIPTION OF THE DRAWINGS

Features and advantages of the invention will be better appreciated by virtue of the following description, which description makes reference to the appended figures, which show:

FIG. 3, an illustration relating to the second step of the method according to the invention, showing an example of a table collating the various possible ways in which the resources of a power amplifier may be allocated depending on the adopted sharing scheme and the maximum capacities per beam corresponding to the various sharing schemes;

FIG. 9, an overview of the various phases of the fourth step of the method according to the invention.

It will be noted that, in the appended figures, a given structural or functional element has preferably been referenced with the same reference symbol.

DETAILED DESCRIPTION

Figure 1:
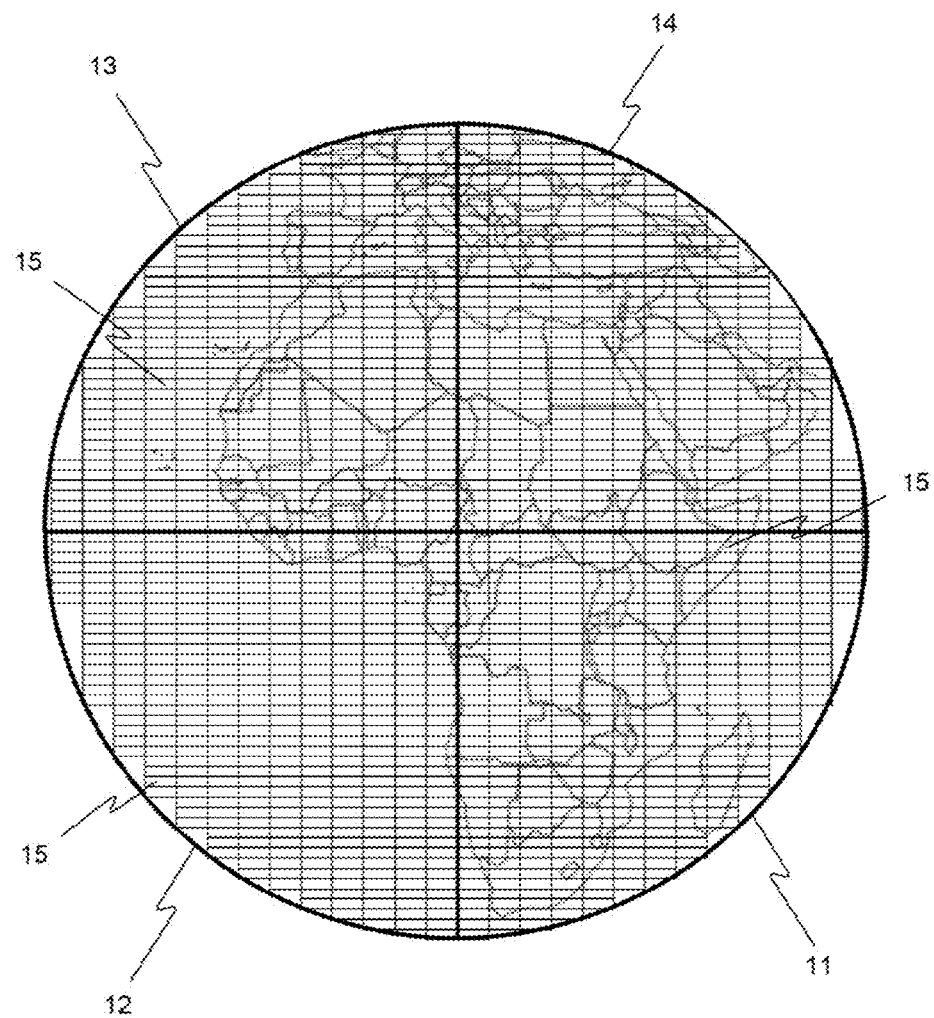
FIG. 1, an illustration of an example of coverage of a geographical zone by means of a geostationary satellite equipped with an antenna system comprising four multi-source antennas.

FIG. 1 shows an example of coverage of a geographical zone with a geostationary satellite having an antenna structure comprising four antennas 11-14, covering the zone in question uniformly.

As illustrated in the figure, each antenna 11-14 radiates elementary electromagnetic beams of rectangular geometric shape. The radiated beams thus, elementary geographical zones, or spots, arranged rectilinearly in juxtaposed rows and/or columns.

Each elementary beam thus radiates an elementary geographic zone 15 in which a number of users may be found, this number being a priori variable in particular depending on the covered elementary zone, which may for example be located on solid earth or at sea.

This four-antenna structure is considered here merely to give a context to the description, and must not be considered as being intended to limit the scope or extent of the invention. In particular, it is possible to deploy the method according to the invention on satellites, whether they are geostationary or not, comprising a different number of antennas, delivering beams having another geometric shape, a polygonal or circular shape for example.

Figure 2:
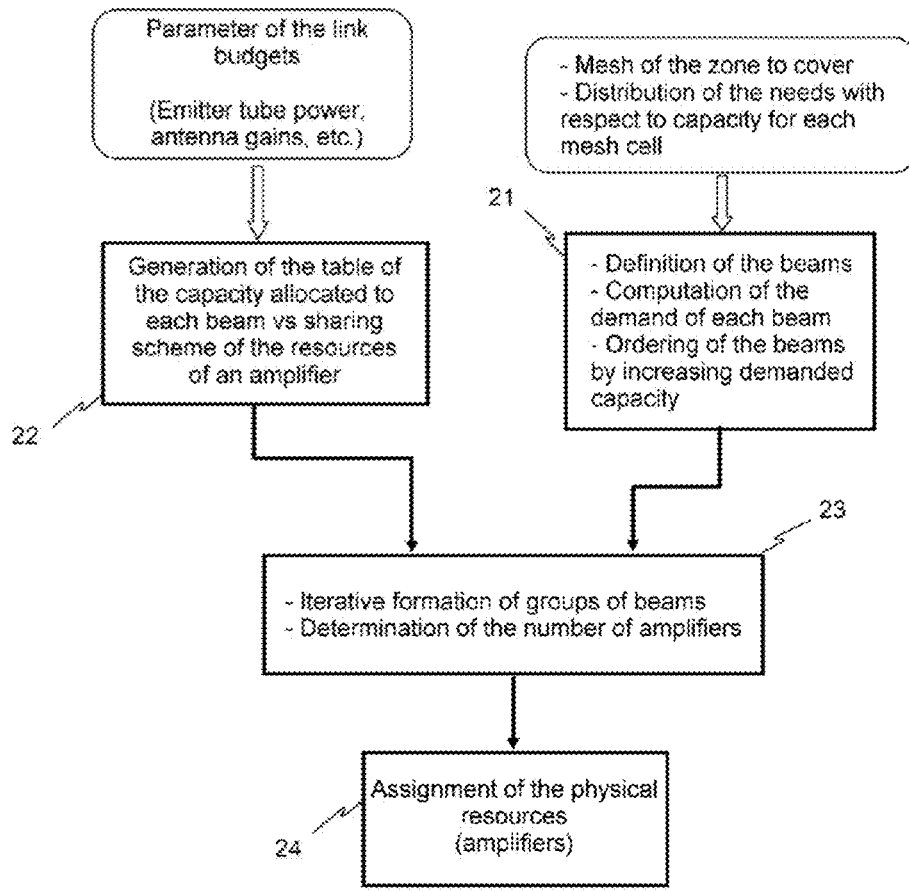
FIG. 2, an overview of the various steps of the method according to the invention.

FIG. 2 shows, in the form of a flowchart, the various steps of the method for allocating the total capacity of a satellite according to the invention.

The method according to the invention mainly comprises:
a first preliminary step 21 of dimensioning the maximum number of satellite beams, of defining the capacity demanded by each of the beams, and of ordering the beams in increasing demanded capacity;
a second step 22 of generating the table defining, for various sharing schemes, the number of beams delivered by a given power amplifier and the capacity allocated to each beam delivered by this amplifier; this step preferably being carried out in parallel to step 21;
a third step 23, of forming groups of beams from the $N_T$ beams that the satellite must deliver, this step comprising
a first substep 231 of computing the average value of the cumulative capacity of the N first beams ranked in order of increasing capacity demand starting from the lowest; N possibly varying from 1 to the total number $N_T$ of beams, said step allowing a graph to be obtained, an example of which is given in FIG. 5.
a second substep 232 forming, from the $N_T$ beams, a group of $N_i$ beams ($N_i \leq N_T$), this group being defined based on a given average capacity value Cm. This step is carried out using the graph determined in the preceding step.

The capacity value Cm associated with a group is moreover defined depending on the sharing scheme that it is desired to apply to the beams of this group.

Preferably, the beams forming a given group are determined such that the average capacity Cm demanded by the beams of the group thus formed is as close as possible to the capacity allocated to each beam of the group, this capacity being estimated in step 22 for the sharing scheme in question.

The third step 23 is carried out iteratively, the $N_i$ beams that have been grouped at the end of a given iteration being excluded from the following iteration.
a fourth step 24 of the assigning, to the various groups of beams that have been formed at the end of the third step 23, amplifier resources available to the satellite in question.

The first step 21 has the function of distributing, over a regular mesh, the various beams that the satellite is able to deliver. The higher the maximum number $N_T$ of beams that the satellite is able to produce, the smaller the size of a spot will be.

Step 21 also has the function of assigning to each beam a given required capacity, depending on the capacity demand associated with the elementary zone, or with the elementary zones, covered by the beam in question, then of ordering the various beams by increasing capacity values.

This order may for example be embodied by a table, stored in memory, in which are ranked, in order of increasing demanded capacities, the identifier of each beam (number of the beam) and the value of the capacity demanded for the beam in question.

In the second step 22, the method according to the invention determines, for various types of high-power amplifiers, and for various possible schemes for sharing the capacity of the amplifier in question, the number of beams able to be fed by the amplifier and the capacity delivered to the various beams.

This determination is carried out taking into account link-budget hypotheses (on-board/ground power amplifier, on-board/ground antenna, etc.).

The configurations adopted in the context of the invention are determined by the combination of the operating modes supported by the power amplifier in question:
- full-band operation or division into a plurality of frequency subbands,
- operation with beam hopping (time sharing or time division) with a view to delivering one or more beams;
- operation with beam coupling (power of the amplifier shared in its operating band between a plurality of beams).

Each configuration (combination of the three operating modes described above) thus determines the number of beams that may be delivered by a power amplifier and the average capacity attributed to each beam.

In practice, these capacity values are, for example, stored in memory in a table, the fields of which are the values of the operating parameters corresponding to the various envisioned distribution schemes, such as those illustrated in FIG. 3.

The average capacity per beam associated with an amplifier is computed by taking the product of the bandwidth associated with the beam (expressed in Hz) and the spectral efficiency (expressed in bits/second/Hz) estimated for an average link budget of the coverage provided by the satellite.

This average link budget is determined based on hypotheses that are independent of the sharing scheme (performance of the antenna of the user terminals, performance of the antenna of the satellite, atmospheric losses, losses in free space, etc.), while taking into consideration the impact of the use of beam coupling.

FIG. 3 shows an example of a table indicating, for a given power amplifier, a travelling-wave-tube amplifier in the example, depending on the power that it is able to deliver (160 W or 240 Watts in the shown example) and on its working frequency band (2900 MHz in this example), the number of beams that this amplifier is able to feed and the capacity available to each beam, in various distribution schemes corresponding to various associations of the functional configurations (division into subbands, operation with beam hopping and operation with beam coupling) described above.

Thus, if the table of FIG. 3 is considered, it may be seen that for a power amplifier of given bandwidth, with the distribution schemes considered in this example, is it is possible to form, with a given amplifier, 2 to 64 beams, these beams having different capacities.

According to the invention, a distribution-scheme selection is carried out so as to allow a distribution, of the beams between these schemes, that optimizes the compromise between:
- the match between the available capacity and the capacity required by these beams, and
- the required total number of power amplifiers.

With this aim, the adopted schemes must cover a wide range of capacity values per beam, and thus allow a high degree of capacity sharing for power amplifiers associated with beams of lower demand and a lower degree of capacity sharing for amplifiers associated with beams of high demand.

As was described above, the function of the third step 23 is to group the $N_T$ beams to be delivered into groups, each group of $N_i$ beams being delivered by a given number of power amplifiers, employing the same resource-sharing scheme, this sharing scheme defining, for an amplifier, an average capacity value per delivered beam.

The number of power amplifiers required to deliver all of the $N_T$ beams in question, with a capacity that is close as possible, for each beam, to the required capacity, and the operating configurations of the amplifiers for each of the formed groups of beams, are thus determined.

According to the invention, the output sections associated with the amplifiers delivering a given group of beams all utilize the same sharing scheme. An output section is embodied by a power amplifier and by the components located downstream of an amplifier.

Also according to the invention, each group is formed, depending on a given value Cm of the average capacity per beam, in such a way that the average value of the cumulative capacity of the beams of the group in question is substantially equal to the value Cm associated with the group in question.

Figure 4:
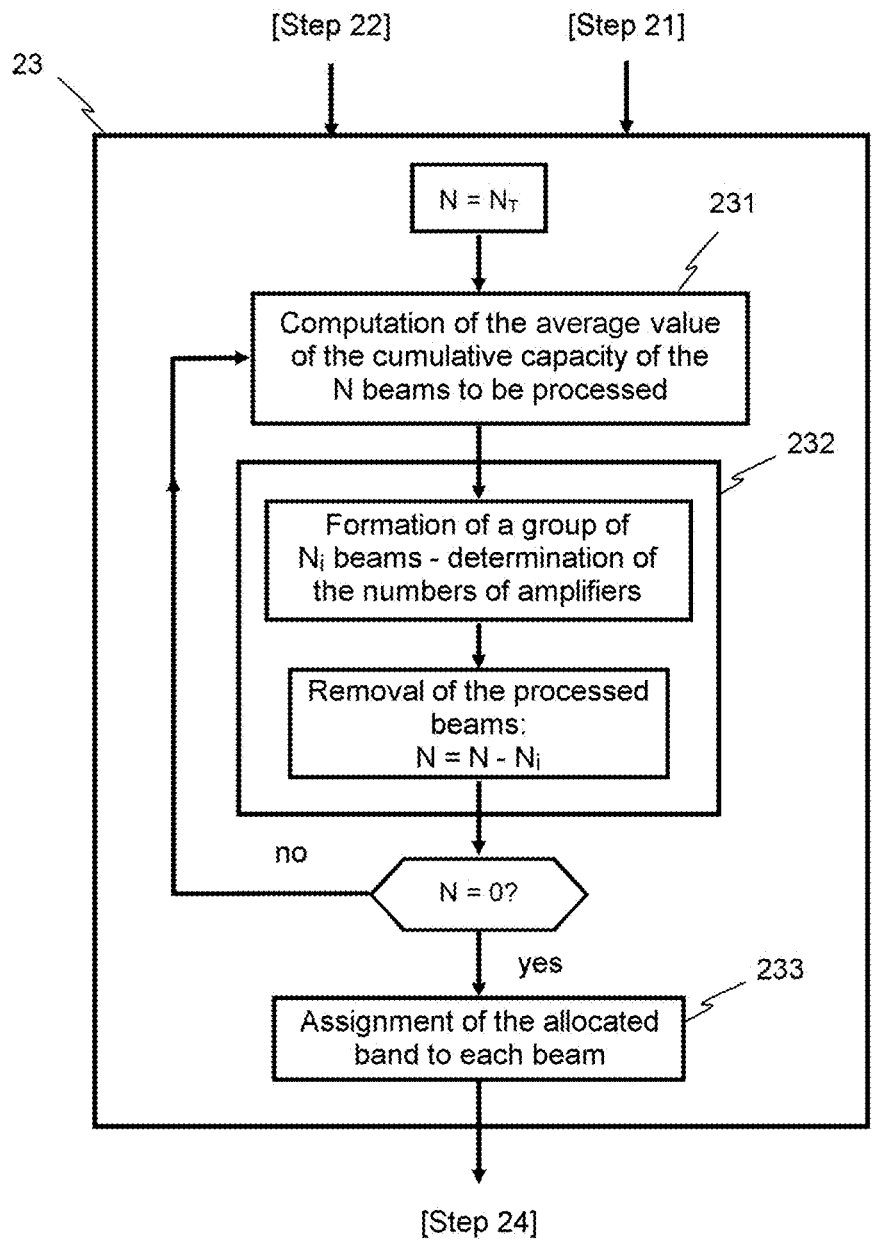
FIG. 4, a detailed functional overview of the third step of the method according to the invention.

To achieve this distribution of the beams into groups, step 23 comprises, as the flow chart of FIG. 4 illustrates, two substeps 231 and 232 that are executed iteratively and the execution of which allows the various groups to be successively formed.

The first substep 231 computes, for a set of N beams classed in order of increasing capacity, the average value of the cumulative capacity of these beams, the capacity required for each beam having been determined in the first step 21.

Figure 5:
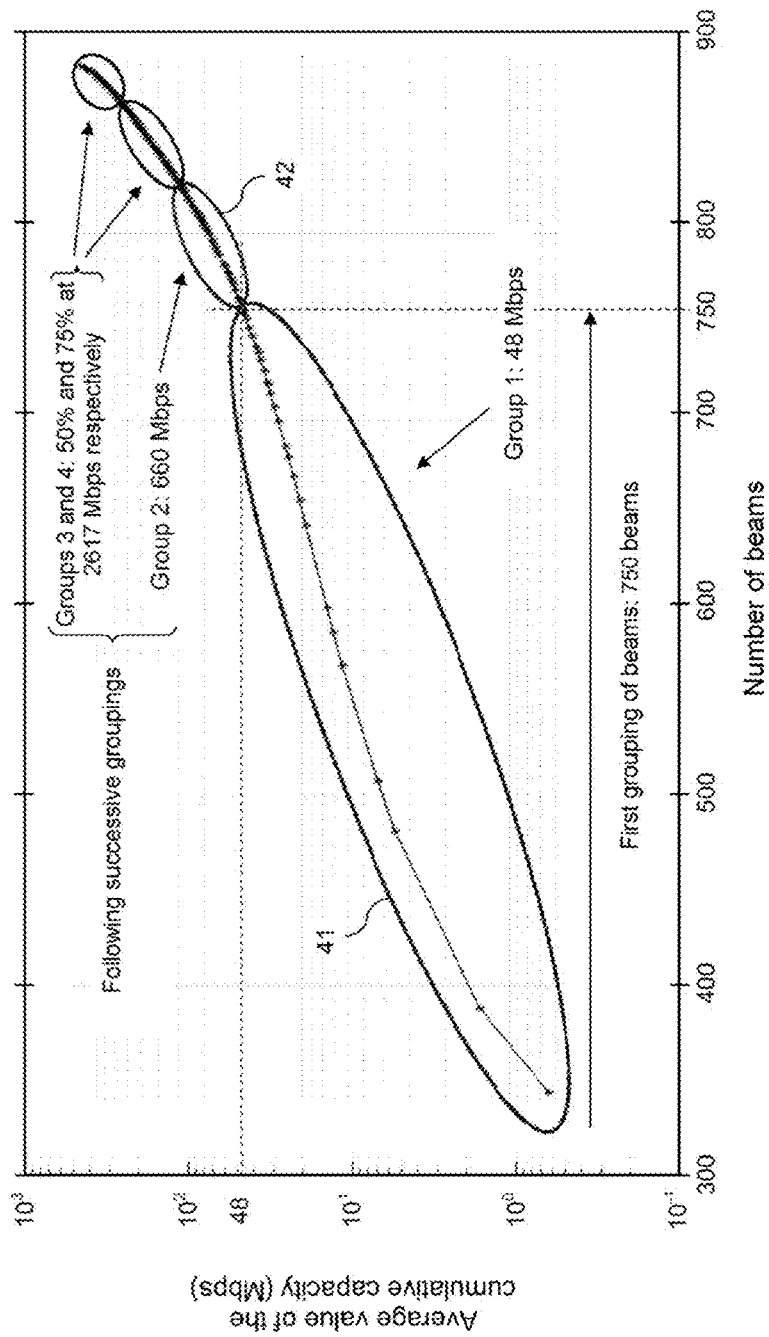
FIG. 5, a graphical representation of an example of the variation in the average value of the cumulative capacity over the total number of beams to be delivered, used in the first iteration of the third step of the method according to invention.

This function may be represented, for the first iteration of this step ($N=N_T$), by a curve such as that of FIG. 5, which represents the variation in the average value of the cumulative capacity as a function of the number n of beams taken into account in the computation, all of the beams being considered.

FIG. 5 relates to a system, taken as example, comprising $N_T$=890 beams, for which beams the average value of the cumulative capacity varies from a few tens of kilobits per second (Kbps) to a few thousand megabits per second (Mbps). The average value of the cumulative capacity is given here for all the $N_T$ beams.

In practice, the successive values of the average of the cumulative capacity for N beams, N possibly varying from 1 to $N_T$ may be stored in a table of $N_T$ values.

The second substep 232 associates, in a given group, the beams for which the average value of the cumulative capacity is the closest to a given value, Cm, of the average capacity per beam.

This capacity Cm is selected, in the table generated in the second step 22, so as to maximize the number of beams able to be delivered by the power amplifiers available to the satellite while ensuring an optimal link budget.

The number $N_i$ of beams forming the group of rank i thus formed determines the number of amplifiers required to deliver these beams, the capacity Cm associated with this group corresponding to the sharing scheme associated with the power amplifiers delivering the beam group thus formed.

According to the invention, step 23 is executed iteratively, considering values Cm of the average capacity that increase from one iteration to the next.

Thus, as illustrated by the example of FIG. 5, step 23 is executed a first time considering all of the $N_T$ beams:
in substep 231, the variation in the average value of the cumulative capacity is computed considering 1 to $N_T$ beams. The average values of the cumulative capacity are for example stored in memory in a table for each iteration of step 23.

Next, in substep 232, a first group of beams 41, which comprises the $N_1$ beams having the lowest needs with respect to capacity, for which beams the average value of the cumulative capacity is closest to a first average capacity value $Cm_1$, is formed.

According to the invention, this value $Cm_1$ is selected from the table obtained after executing step 22 (second step).

Step 23 is then executed iteratively considering, in each iteration i, those $N_T$ of the beams that are have not yet been assembled into groups.

In practice, before each iteration i, the number $N_i$ of beams not yet grouped is determined, then substeps 231 and 232 are applied to these beams considering a new capacity value $Cm_i$ suitable for the remaining beams.

Figure 6:
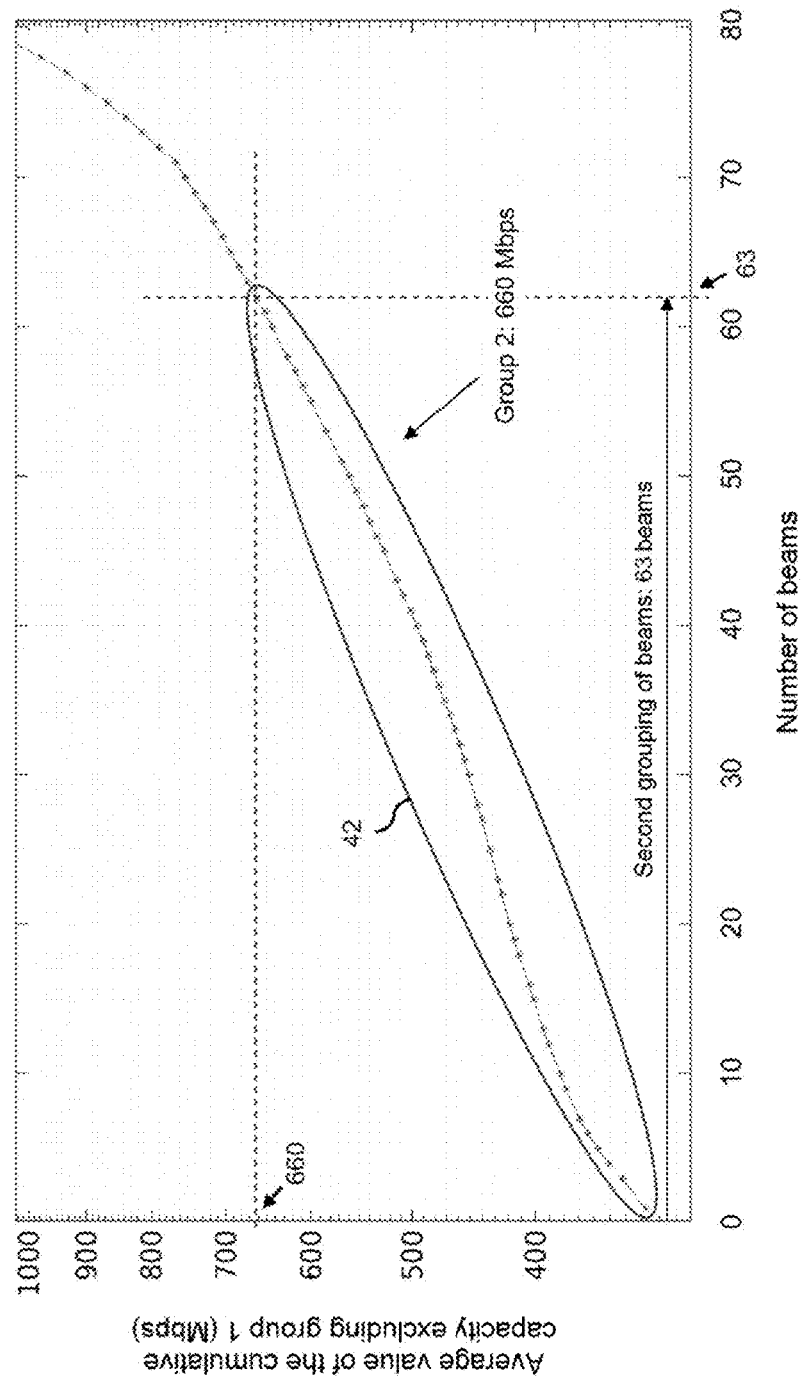
FIG. 6, a graphical representation of an example of the variation in the average value of the cumulative capacity over the number of non-grouped beams to be delivered at the end of the first iteration and used in the second iteration of the third step of the method according to the invention.

FIG. 6 illustrates the operating principle of substep 232 for the second iteration.

In each iteration i beams for which the average cumulative-capacity value is closest a capacity value $Cm_i$ considered for the current iteration are thus grouped together.

It will be noted here that, in the course of the iterations, beams grouped into a given group have an increasingly high average cumulative-capacity value.

Thus, the value $Cm_i$ based on which a group is formed tends to also become increasingly high.

According to the invention, iterations 231 and 232 of step 23 cease when all the $N_T$ beams have been grouped.

FIGS. 3, 5 and 6 allow the operating principle of step 23 to be better understood by way of an example of implementation relating to a satellite having a maximum number of 60 amplifiers with a view to delivering a number of beams equal to 890.

It may be seen that, in such a configuration, each amplifier is required to deliver, on average, substantially 15 beams.

It will be noted that the maximum number of amplifiers available to a satellite is, in practice, determined by the limits on the mass and power budgets of the satellite, and by other factors, such as for example constraints on the installation of these pieces of equipment on the satellite platform.

Thus, if the table of FIG. 3 is considered, for example, it may be seen that if TWT amplifiers of a power of 240 W and having a bandwidth of 2900 MHz are chosen, the sharing scheme this allows a sufficient number of beams (a number much higher than 15 for the first group) to be delivered and that provides the highest average capacity per beam, is that for which each amplifier operates in a configuration in which its bandwidth is divided into four subbands each subband being used to sequentially deliver eight beams ("beam hopping" equal to 4 and "beam coupling" equal to 2).

With such a scheme, each amplifier may deliver 32 beam-hopped beams, each beam having an average capacity substantially equal to 48 Mb/s.

Thus, in the first iteration of step 23, the first group of beams, which contains the beams of lowest capacity, is formed by determining, from the tables of average values of cumulative capacity established at the end of step 231, the beams of lowest capacity for which the average cumulative-capacity value is closest to the adopted average capacity $Cm_1$ (48 Mbps). This average value corresponds to a given number $N_1$ of beams, 750 beams in the example illustrated in FIG. 5.

At the end of a first iteration of step 23, a first group of 750 beams is thus formed, the number of amplifiers required to deliver these beams (750/32=24 amplifiers) being determined by the number of beams able to be delivered by an amplifier operating according to the adopted first sharing scheme.

Step 23 is then reiterated so as to form a new group in each iteration i, each iteration being executed for a decreasing number N of beams, the beams already forming a group no longer being taken into account.

In each new iteration, a new table of average values of cumulative capacity is established for the remaining beams then, in step 232, the average value closest to one of the average values Cm of the capacity per beam delivered by an amplifier for the various sharing schemes considered in the second step 22 is sought in the table of the obtained average values.

The adopted sharing scheme is then that is associated with the adopted value Cm.

Thus, in the example in question, a second group of beams 42, for which group the average of the cumulative capacity is close to 660 Mbps, is defined, this capacity corresponding substantially, as illustrated in the table of FIG. 3, to the capacity delivered to each beam by an amplifier operating according to a sharing scheme in which its bandwidth is divided into two subbands, each subband being used to sequentially deliver two beams ("beam hopping" equal to 2 and no "beam coupling").

Next, in the context of a third iteration, the remaining (non-grouped) beams are considered.

These beams, since they require a capacity higher than 1300 Mb/s, are treated considering the sharing scheme of the output section that simply involves a division into two subbands, which allows an amplifier to deliver a capacity Cm of about 1300 Mbps.

For the most demanding (demand>1300 Mbps) it is moreover possible to envision sharing bandwidth between two subbands of unequal widths, the subband equal to 75% of the band of the amplifier being attributed to very demanding beams, delivering a capacity close to 2000 Mbps.

At the end of step 232 each beam group is thus associated with a given frequency bandwidth corresponding to the bandwidth associated with the beam group to which it belongs. This frequency band advantageously covers the capacity required to deliver the beam in question.

Step 23 also comprises a final step 233, which is executed when all the beams have been distributed into groups, during which a precise frequency band is allocated to each beam depending on the group in which it is placed, this frequency band having the width attributed to the group to which the beam belongs.

According to the invention, this allocation is carried out taking into account an elementary allocation scheme that attributes a color to each beam forming the coverage provided by the satellite.

By color, what is meant here is an attribute consisting, for each beam, of the bandwidth attributed to the beam in question, or, in the case of a satellite provided with an antenna operating along two polarization axes, of a (frequency band, polarization axis) pair, bearing in mind that for a given beam the polarization axis is set by the radiating element delivering the beam in question.

The allocation scheme is determined, taking into account the various groups of beams formed in step 232, and the polarization axes attributed to the various beams, in such a way that two neighboring spots are attributed a separate color so as to guarantee the best possible decoupling between the two spots in question.

Figure 7:
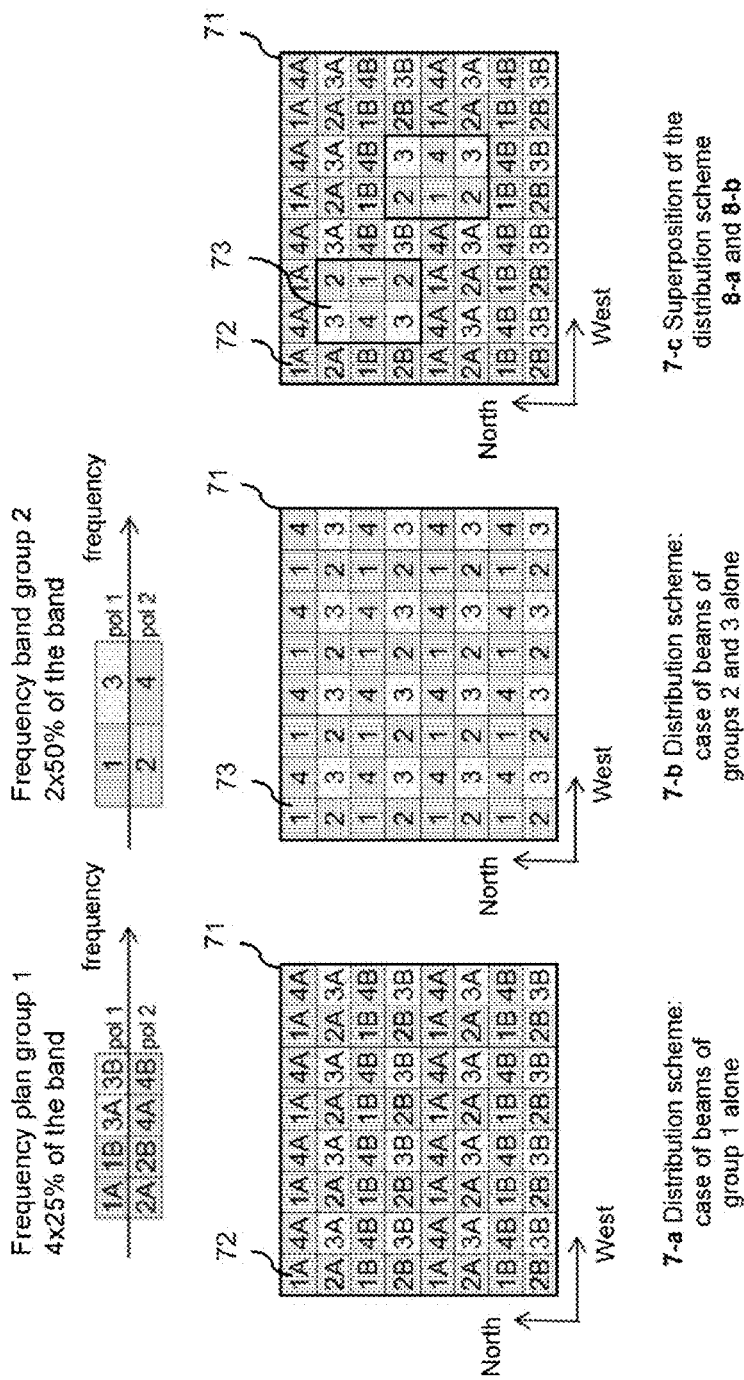
FIGS. 7 and 8, illustrations of the principle of assignment of bandwidths to the various beams forming the satellite coverage.

FIG. 7 illustrates the operating principle of this step by way of a particular example of implementation corresponding to a rectilinear, matrix-array, arrangement of the beams into rows and columns, which arrangement corresponds to the satellite coverage illustrated in FIG. 1.

Illustration 7-a shows a first scheme corresponding to the assignment, to each beam, of a bandwidth equal to one quarter of the bandwidth of an amplifier, two neighboring beams on a given row or in a given column being assigned two separate polarization axes, pol1 and pol2.

Such a distribution scheme corresponds to the case where all the beams are beams that are similar, with respect to capacity, to those of group 1 of the groups defined in the example illustrating step 23 described above (see FIG. 5).

Illustration 7-b shows, for its part, a second distribution scheme corresponding to the assignment, to each beam, of a bandwidth equal to half the bandwidth of an amplifier, two neighboring beams on a given row or in a given column being assigned, as in the case illustrated in 7-a, two separate polarization axes, pol1 and pol2.

Thus, in this second scheme, the bandwidths assigned to the beams are arranged with the same geographic distribution of the polarizations and of the subbands. In other words, a spot 72 of the distribution scheme 7-a is attributed the same polarization as the corresponding spot 73 of the distribution scheme 7-b and the subband attributed to the spot 72 is included in the subband of the corresponding spot 73.

Such a distribution scheme corresponds to the case where all the beams 73 are beams that are similar, with respect to capacity, to those of groups 2 and 3 defined in the example illustrating step 23 described above (see FIG. 6).

The example of FIG. 7 allows it to be seen that use, in step 22, of a sharing scheme involving dividing the bandwidth of a power amplifier into two or four subbands advantageously allows, simply, a sharing scheme to be generated that allows both for beams 72 belonging to the group 1 and beams 73 belonging to groups 2 and 3, the sharing schemes being able to be superposed, as illustrated in FIG. 7-c, without this superposition introducing additional interference between beams.

At the end of step 233, each beam is thus associated with one given frequency subband, the width of which corresponds to the capacity required by the beam in question.

Figure 8:
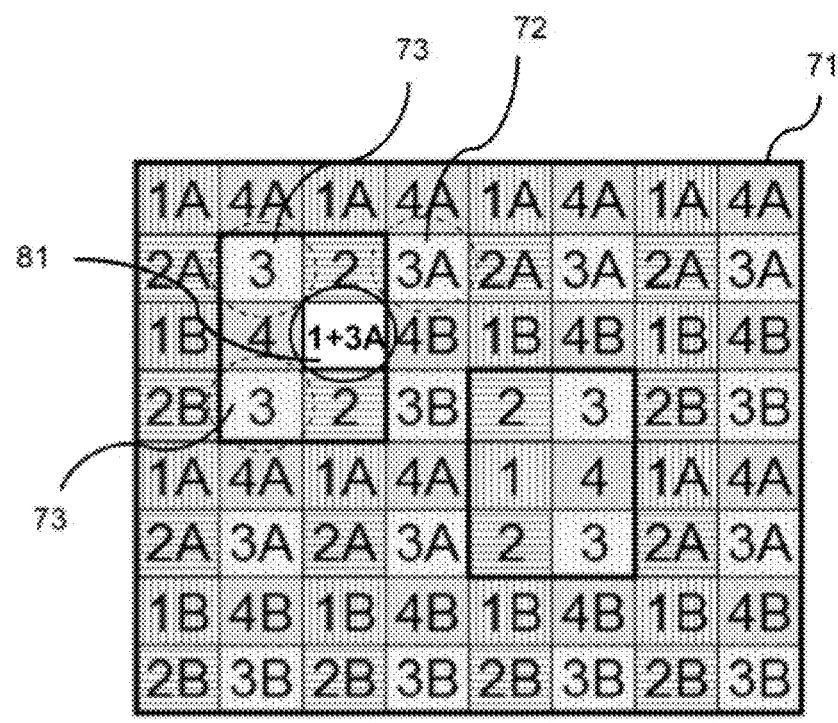

It will be noted that, for arrangements comprising beams that have a high capacity demand (demand>1300 Mbps for example), for which beams it is necessary to provide a frequency bandwidth equal, for example, to three quarters (75%) of the bandwidth of an amplifier, the distribution scheme, such as that described above, intended to define the distribution of the available subbands, a subband representing 25% or 50% of the bandwidth of an amplifier, still remains applicable. However, as illustrated in FIG. 8, allowance must then be made for possible interference between a beam 81 occupying 75% of the bandwidth of an amplifier and one or more neighboring beams 72 or 73 using a common subband in the same polarization, by for example making provision for a particular management of the frequencies allocated to the users located in a zone close to the limits of the zone covered by such a beam.

The function of the fourth step 24 of the method according to the invention is to assign a physical resource, of an amplifier with which the satellite is equipped, to each of the beams.

In other words, the method carries out, within each group defined precedingly, a second grouping of the beams into subgroups, each subgroup being associated with one power amplifier operating with the corresponding sharing scheme (with or without separation into subbands, with or without beam coupling and with or without beam hopping).

This assignment makes it possible to determine, for each amplifier, the beams that will be delivered by said amplifier.

According to the invention, this assignment is carried out so as to optimize the use of the various power amplifiers on board the satellite, by using as much as possible all the capacity delivered by each amplifier.

For practical reasons of limiting the complexity of the harness, the assignment of resources is preferably carried out antenna by antenna. It is however possible to carry out this assignment considering a plurality of antennas at the same time.

According to one particular implementation of the invention, taken as example, the assigning fourth step 24 applies, to each group formed after execution of the step 23, processing the sequencing of which is illustrated in FIG. 9. This processing comprises the phases described in the rest of the text.

In a first processing phase 241, the method according to the invention determines whether the group in question utilizes a sharing scheme employing beam coupling or beam hopping.

If yes the method according to the invention continues with a processing phase 242 during which it determines whether the group in question utilizes a sharing scheme employing beam coupling.

If yes it carries out a first operation 243 of grouping the beams corresponding to (rowwise or columnwise) adjacent spots served by a given frequency subband, taking into account the sharing scheme adopted for the group.

The beams are thus grouped in subgroups of N beams, the number N depending on the number of beams between which the power of an amplifier, for the subband in question, is distributed. In practice, the number N is generally equal to 2 or 4.

Thus, for example, if the sharing scheme makes provision to share power (beam coupling) between two or four beams, the beams forming the group in question are associated in twos or in fours.

If in contrast the group in question utilizes a sharing scheme that does not employ beam coupling, no grouping of beams is carried out: the first grouping operation 243 is not executed.

The method according to the invention then continues with a processing phase 244, during which it determines whether the group in question utilizes a sharing scheme employing beam hopping.

If yes, it performs a second operation 245 of grouping the beams served by a given frequency subband, once again taking into account the sharing scheme adopted for the group.

In the case where beam coupling is not employed by the group in question, The beams are thus grouped into subgroups of M beams, the number M depending on the number of beam-hopped beams.

In the case where beam hopping is carried out, this operation is performed while preserving the groups of N beams produced by the first grouping operation 243.

The groupings of beams realized by the operation 245 then consists in grouping these groups of N beams into structures each formed of k2N beams. In such a case, the formation of these structures follows the following 2-step scheme:

1) Producing 2N-beam structures containing the beams of two groups of N beams. This step consists in performing the following operations:
   a1) Determining the group of N beams having the maximum cumulative capacity;

b1) Determining a second group of N beams having in addition to the first the minimum cumulative capacity;

c1) Associating the two groups to form a 2N-beam structure.

d1) Repeating operations a1), b1) and c1) until all the groups of N beams have been grouped into 2N-beam structures or there remains only a single group.

Each structure is thus formed by that of the not yet associated groups having the maximum cumulative capacity and that of the not yet associated groups having therewith the minimum cumulative capacity.

2) Producing structures containing the beams of 2k groups of N beams (k>1: if k=1 the process stops with the 2N-beam grouping described above). This step consists in performing the following operations:

a2) Determining the kN-beam structure having the maximum cumulative capacity;

b2) Determining a second group of kN beams having in addition to the first the minimum cumulative capacity;

c2) Associating the two structures to form a 2kN-beam structure;

d2) Repeating, until all the kN-beam structures have been grouped into 2kN-beam structures, or there remains only one structure.

Each structure being formed by that of the not yet associated structures having the maximum cumulative capacity and that of the not yet associated structures having therewith the minimum cumulative capacity.

Step 2), of producing structures containing the beams of 2k groups of N beams, is repeated iteratively until M·N-beam structures are obtained, M·N being equal to the number of beams able to be delivered by an amplifier for the subband in question, in accordance with the adopted sharing scheme.

If in contrast the group in question utilizes a sharing scheme that does not employ beam hopping, but only beam coupling, the groups of N beams are not grouped: the second grouping operation 245 is not executed.

After execution of the first grouping operation, 243, and/or second grouping operation, 245, step 24 continues with an operation 246 of assigning actual physical resources.

In the case where, for the group in question, the sharing scheme employs beam coupling and beam hopping, the operation 246 of step 24 will then assign a subband of an amplifier to each structure, so that the number of amplifiers required for the group in question is equal to the maximum number of structures counted for each subband of the sharing scheme in question.

In the case where, for the group in question, the sharing scheme employs solely beam coupling or beam hopping, operation 246 of step 24 will then assign a subband of an amplifier to each subgroup of N or M beams, so that the number of amplifiers required for the group in question is equal to the maximum number of groups of beams counted for each subband of the sharing scheme in question.

Moreover, if the group in question utilizes a sharing scheme that does not employ beam coupling or beam hopping, no beam grouping is carried out. The latter case mainly concerns groups of beams containing beams requiring a high capacities.

Operation 247 of step 24 will then assign an entire subband of an amplifier to each beam, so that the number of amplifiers required for the group in question is equal to the maximum number of beams delivered in each subband of the sharing scheme in question.

It will be noted that it may be advantageous, with a view to limiting interference in particular, for the beams associated, in the context of a sharing scheme employing beam coupling, with a given amplifier in a given subband, to be radiated by the antenna in question with different polarization directions.

Thus, for example in the case of association of beams into groups of two, the two associated beams will possibly be radiated with opposite polarizations.

Likewise, in the case of association of beams in groups of four, two associated beams will possibly be radiated with one given polarization, and the two others with the opposite polarization.

It will also be noted that, at the end of this grouping operation, the amplifiers assigned last may be only partially utilized, in the entirety of their working frequency band, in particular if the number of NM-beam structures or of groups of N or M beams obtained in each subband is different from one subband to the next.

For this reason, the method according to the invention may, advantageously, comprise, as illustrated in FIG. 9, a phase 248 of resource optimization consisting in intergroup processing, during which phase amplifiers that are partially exploited in the context of a group of beams are tallied, in such a way that the resources that need to be provided by two amplifiers assigned to two different groups of beams, are provided by one and the same amplifier. In other words, this optimization may advantageously be carried out in the case where two amplifiers in two different groups are partially used in separate subbands. A single amplifier may then be assigned to the corresponding beams.

It will furthermore be noted that the capacity demanded by a beam may prove to be variable over time, and hence the arrangement of the beams may take into account various temporal configurations (table per year, and/or per hour in the day for example).

It is thus for example possible to consider a common time, a time corresponding to a maximum amount of activity for most of the beams and to determine, for this time, the capacity required for each beam. The different beams are then arranged in light of the capacities required by the various beams during a given period about this given time.

Alternatively, it is also possible to consider, for each beam, a required capacity value corresponding to a peak value in all of the time ranges taken into account. The various beams are then arranged so as to minimize the peak values resulting from the groupings.

In this case, the determination of a second subgroup of beams having in addition to the first the minimum cumulative capacity amounts to searching for the second subgroup allowing the required peak capacity to be minimized by associating the 2 subgroups.

Thus, at the end of step 24, the method according to the invention delivers an optimized resource-allocation scheme that allows the number of amplifiers required to provide the given coverage, the operating mode, the sharing scheme to be adopted and the matrix of assignment of the beams to the amplifiers to be determined. The obtained capacity distribution is then nonuniform over the covered area (different capacity depending on the group of beams) and may be reconfigured flexibly using the beam-hopping operating mode.

The invention claimed is:

1. A method for distributing the capacity of a communication satellite between the various beams intended to cover a given geographical zone, said zone being divided into a plurality of spots, each spot being irradiated by one given beam emitted by one radiating element of a satellite antenna and requiring a given capacity, said method comprising the steps of:
- a first step of defining, for each beam, the capacity from which the beam must benefit on account of a density of exchanges occurring in a corresponding spot;
- a second step of generating a table indicating, for a power amplifier having various operating bandwidth and power characteristics, a maximum number $P_t$ of beams that the amplifier is able to deliver and an average capacity allocated to each beam, depending on various amplifier sharing schemes;
- a third step of forming groups of beams, each group being characterized by an average value of the capacity of the beams forming the group in question, and determining a number of amplifiers required in each group to deliver all of the beams forming this group;
- a fourth step of allocating available resources by distributing the various beams between various amplifiers, the beams assigned to a given amplifier being determined in such a way that the average value of the capacity demanded by these beams is equal to a reference average capacity computed for the group in question.

2. The method according to claim 1, wherein the third step is an iterative step that implements the following substeps:
- a first substep during which the method computes, for a set of $N_T$ beams classed in increasing order of capacity, the average value of the cumulative capacity of these beams, the capacity required for each beam having been determined in the first step;
- a second substep, during which the method according to the invention associates, in a first group i, the $N_i$ beams for which the average value of the cumulative capacity is closest to a given value, Ci_obj, of the average capacity per beam; this value being determined, from the data of the table generated in the second step, so as to maximize the number of beams able to be delivered by the power amplifiers available to the satellite while ensuring an optimal link budget;
- the $N_i$ beams associated in a given group i at the end of a given iteration being withdrawn from the N beams considered in the execution of a new iteration;
- the iterations being interrupted once the $N_T$ beams have been grouped.

3. The method according to claim 1, wherein in the fourth step of allocating resources, the method couples a plurality of beams depending on the sharing scheme of the group forming a given group i and using a same subband to associate said beams with a given amplifier.

4. The method according to claim 3, wherein the fourth step comprises the following phases of execution:
- a first phase during which each group of beams formed is classified depending on the sharing scheme that is associated therewith, the groups of beams associated with a sharing scheme employing neither beam coupling nor beam hopping not being the subject of any subsequent systematic group-assignment operation;
- a second phase during which it is determined, for each group subjectable to a grouping operation, whether the sharing scheme that is associated therewith employs N-beam beam coupling;
- a third phase that groups beams of the group in question into groups of N; this third phase being executed if the sharing scheme associated with the group employs N-beam beam coupling;
- a fourth phase during which it is determined, for each group subjectable to a grouping operation, whether the sharing scheme that is associated therewith employs M-beam beam hopping;
- a fifth phase during which beams of the group in question are grouped into groups of M; this fifth phase being executed if the sharing scheme associated with the group employs M-beam beam hopping;
- a sixth phase during which, for each group, depending on the groupings performed, an amplifier is assigned to each beam;
- a seventh phase during which, for each group the beams of which have been assigned to no group, an amplifier is directly assigned to each beam.

5. The method according to claim 4, wherein for each group associated with a sharing scheme employing beam coupling and beam hopping, the fifth phase groups the beams of the groups using the grouping into subgroups of N beams carried out in the third phase of the fourth step.

6. The method according to claim 5, wherein during the fifth phase of the fourth step, the beams are grouped by grouping subgroups of N beams into structures each made up of k2N beams, these structures being formed by carrying out two steps:
- a first iterative step of producing 2N-beam structures containing the beams of two groups of N beams, such that each structure is formed by that of the not yet associated groups having a maximum cumulative capacity and that of the not yet associated groups having therewith a minimum cumulative capacity;
- a second iterative step of producing structures containing the beams of 2k groups of N beams (k>1: if k=1 the process stops with the 2N-beam grouping described above);
- the second step being repeated iteratively until MN-beam structures are obtained, MN being equal to the number of beams able to be delivered by an amplifier for the subband in question, in accordance with the adopted sharing scheme.

7. The method according to claim 6, wherein the first step, of producing 2N-beam structures containing the beams of two groups of N beams, consists in performing the following operations:
- determining the group of N beams having the maximum cumulative capacity;
- determining a second group of N beams having in addition with the first the minimum cumulative capacity;
- associating the two groups in order to form a 2N-beam structure;
- repeating the preceding operations until all the groups of N beams are grouped into 2N-beam structures, or there remains only one group.

8. The method according to claim 7, wherein the second iterative step of producing structures containing the beams of 2k groups of N beams consists in performing the following operations:
- determining the kN-beam structure having the maximum cumulative capacity;
- determining a second group of kN beams having in addition with the first the minimum cumulative capacity;
- associating two structures to form a 2 kN-beam structure;
- repeating, until all the kN-beam structures are grouped into 2 kN-beam structures or there remains only one structure;
- each structure being formed, for a given iteration, by that of the not yet associated structures having the maximum cumulative capacity and that of the not yet associated structures having therewith the minimum cumulative capacity.

9. The method according to claim 4, wherein the fourth step comprises a complementary phase of final resource optimization consisting in intergroup processing, which tallies the amplifiers partially exploited in the context of a group of beams, and which attributes these amplifiers to beams of a different group using a band not used by the first group.

* * * * *